Patented Aug. 12, 1941

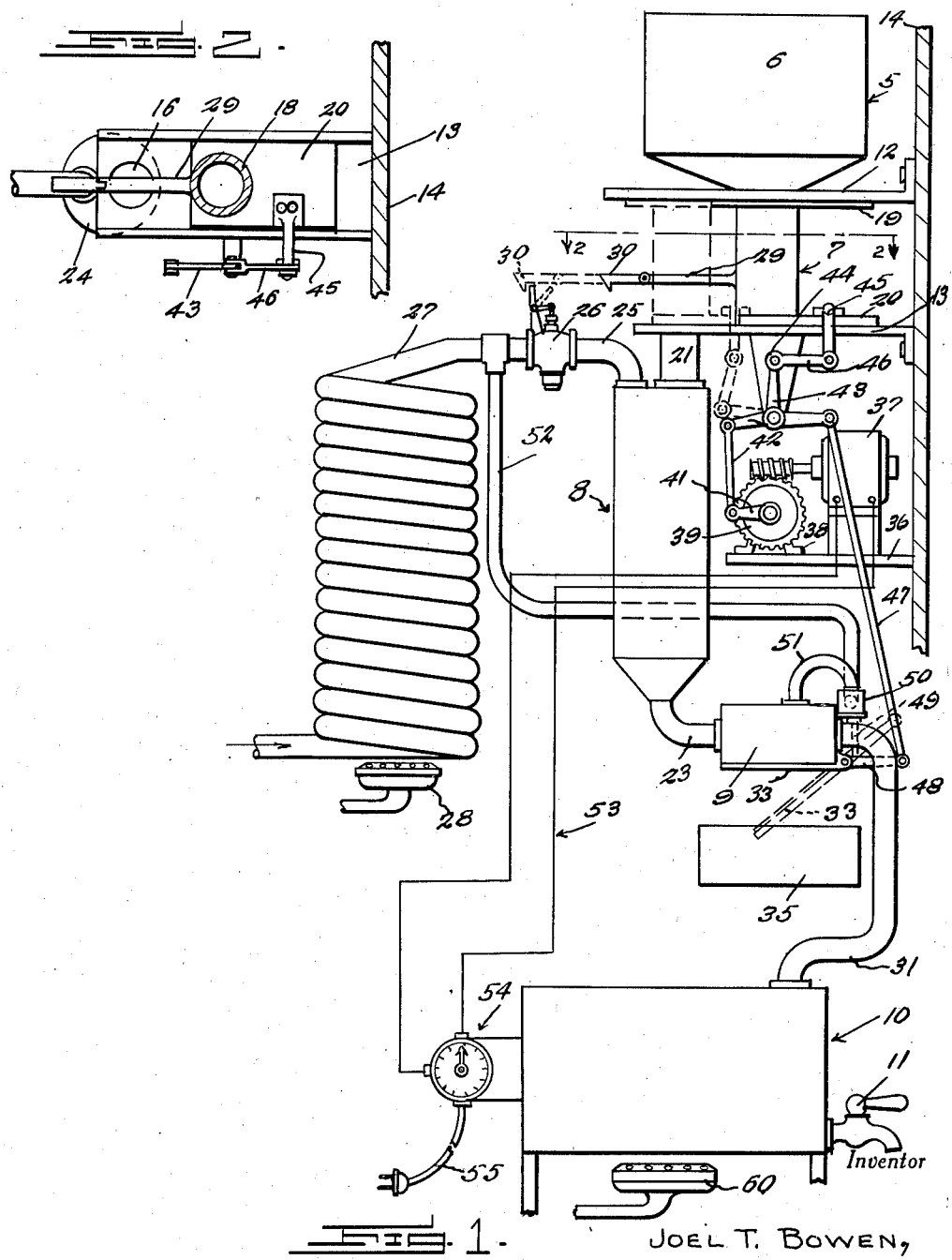

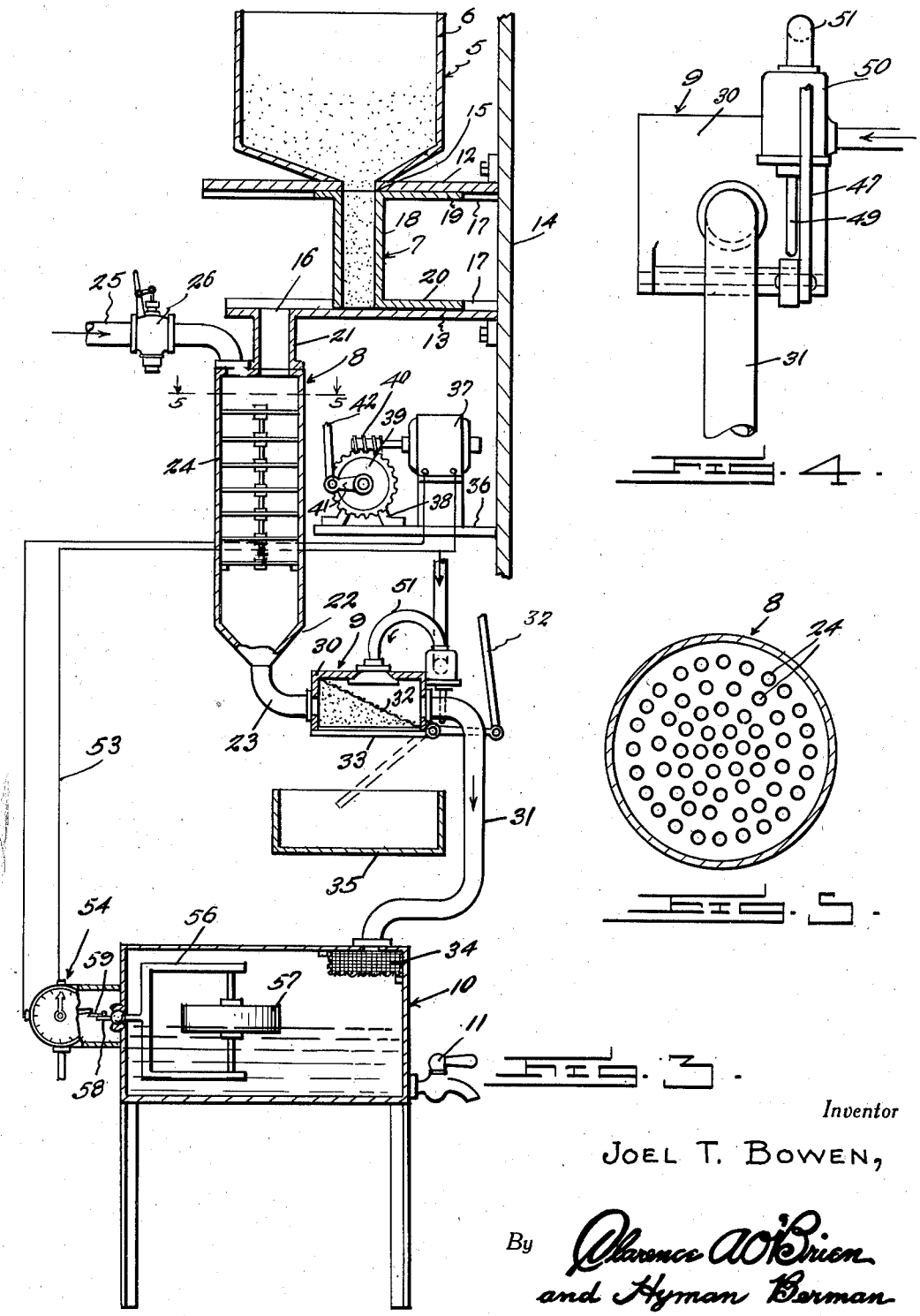

2,252,614

UNITED STATES PATENT OFFICE 2,252,614

COFFEE MAKING DEVICE

Joel T. Bowen, Waco, Tex.

Application September 2, 1939, Serial No. 293,287

2 Claims. (Cl. 53—3)

This invention relates to a coffee making device and has for the primary object the provision of an efficient and inexpensive device of this character which will automatically make coffee beverage in selected amounts and will maintain the beverage hot while awaiting use and will automatically clean itself of coffee grounds and thereby maintain a sanitary condition free of stale coffee beverage and rancid coffee grounds.

Another object of this invention is the provision of a coffee making device of the above stated character which will be durable, compact and economical to manufacture and install and maintain in operation.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section illustrating a coffee making device constructed in accordance with my invention.

Figure 2 is a detail sectional view taken on the line 2—2 of Figure 1.

Figure 3 is a vertical sectional view illustrating the device.

Figure 4 is a fragmentary top plan view showing a flushing valve of a conventional construction associated with a filter for admitting water to the latter to cleanse such filter of coffee grounds.

Figure 5 is a sectional view taken on the line 5—5 of Figure 3.

Referring in detail to the drawings, the numeral 5 indicates as an entirety a coffee making device which consists primarily in a hopper 6, a coffee measuring device 7, a mixing chamber 8, a filter 9, and a storage receptacle 10 from which coffee beverage made by this device may be dispensed by way of a valve 11. The arrangement of the units as described is so that most of the operation of the invention depends upon gravity, thereby simplifying the construction and operation of the invention. It will be seen that the hopper 6 for receiving ground coffee is disposed uppermost, the measuring device next, then the mixing chamber for receiving the measured amount of coffee from the hopper and a predetermined amount of water. The filter is then arranged next for the purpose of separating the coffee grounds from the coffee beverage and the latter flowing from the filter into the dispensing receptacle 10.

Spaced horizontally arranged plates 12 and 13 are mounted on a vertically disposed support 14 and are arranged in superimposed relation. The plate 12 has an opening 15 also the plate 13 has an opening 16 which is arranged laterally of the opening 15. Guide flanges 17 are formed on the plates 12 and 13. The hopper 6 is mounted on the plate 12 with its discharge opening aligning with the opening 15. A measuring sleeve 18 is interposed between the plates 12 and 13 and includes upper and lower plates 19 and 20, the upper plate 19 having slidable contact with the plate 12 while the lower plate 20 has slidable contact with the plate 13 and the flanges 17 prevent displacement of the sleeve 18 from the plates 12 and 13 due to the plates 19 and 20 being located between said guide flanges. The plate 19 acts as a valve for closing the hopper when the measuring sleeve 18 is moved laterally to register with the opening 16 and which will be hereinafter more fully described.

A depending neck 21 is formed on the plate 13 and aligns with the opening 16 and is secured to the upper end of the mixing chamber 8, the lower end of which is tapered, as shown at 22, and connected to a pipe 23 which is in turn connected to the filter 9. Mounted in the mixing chamber 8 is a plurality of superimposed and relatively spaced perforated baffle plates 24.

It will be seen that whenever the measuring sleeve 18 is in alignment with the opening 16 of the plate 12 coffee in the hopper 6 will gravitate in the sleeve 18 and fill the latter so that when the sleeve 18 is slid laterally and comes into alignment with the opening 16 a predetermined amount of coffee will be deposited into the mixing chamber. A hot water supply pipe 25 is connected to the upper end of the mixing chamber 8 and has located therein a measuring valve 26 which may be constructed in accordance with the showing made in the United States Letters Patent No. 1,996,351 or may be of any well known type of measuring valve which is capable, on the operation thereof, to dispense into the mixing chamber 8 a predetermined amount of hot water. The water supply pipe 25 forms a part of a heating coil 27 and said coil is heated by a burner 28 capable of burning gas or any other fuel. The water in the coil 27 is kept hot during the use of this device and the coil may be connected to a water main (not shown).

An arm 29 is carried by the sleeve 18 of the measuring device 7 and includes a hinged dog 30 which is adapted on movement of the sleeve 18 into the position of depositing coffee into the chamber 8 to engage with the operating lever of the mixing valve and bring about opening of said valve. The dog 30 being hinged on the arm 29 will ride free of the operating lever of the valve 26 when the sleeve 18 is returned to a position of receiving coffee from the hopper. The hinge between the arm and the dog may be of the ruler type to prevent said dog from swinging downwardly below a horizontal position but which will permit the dog to swing upwardly to clear the operating lever of the valve 26.

The filter 9 is in the form of a casing 30 which has connected to one end the pipe 23 and an outlet pipe 31 is connected to the opposite end of said casing. Screen material 32 is arranged in the casing and in a diagonal position to separate the end walls of the casing from each other and consequently separate the pipes 23 and 31 from each other. The bottom wall of the casing is in the form of a trap door 33, the purpose of which is to empty the casing of coffee grounds, the latter being checked by the screen material while the beverage coffee flows through the pipe 31 into the dispensing receptacle 10, a suitable strainer 34 being arranged in the dispensing receptacle through which the beverage coffee from the pipe 31 must pass in order to reach the storage space within the dispensing receptacle. A receptacle or catch basin 35 is arranged under the filter to receive the coffee grounds when discharged therefrom along with flushing water which will be hereinafter more fully described.

Arranged below the plate 13 on the support 14 is a horizontal plate 36 forming a support for an electric motor 37 and a bracket 38 on which is journaled a worm gear 39 meshing with a worm 40 secured to the shaft of the electric motor. A crank arm 41 is secured to the worm gear and has pivoted thereto a connecting link 42. The link 42 is pivoted to a bell crank lever 43 and the latter is journaled on a bracket 44 carried by the plate 13. The plate 20 of the sleeve 18 has secured thereto a depending arm 45 which is pivoted to a link 46 and the latter is in turn pivoted to the bell crank lever 43. A link 47 is also pivoted to the bell crank lever 43 and to an arm 48 carried by the trap door 33. The operating medium 49 of a flushing valve 50 lies in the path of movement of the arm 48 so that when the trap door assumes an open position the valve 50 will be opened and the outlet thereof has an outlet pipe 51 connected thereto and to the top wall of the casing 30 of the filter 9 for discharging water into the filter above the screen 32 which will cleanse the screen and also flush the coffee grounds from the filter when the trap door 33 is in an open position. The valve 50 is connected to the hot water supply pipe 25 by a pipe 52.

The electric motor is connected in an electric circuit 53 which includes a time switch 54 mounted on the dispensing receptacle 10 and equipped with an extension cord 55 for connecting the circuit into an electric output (not shown). The time switch is of a conventional construction and used extensively in the electrical art for completing the circuit to the electric motor for a predetermined length of time. When the time switch is started in operation the circuit is completed to the electric motor which operates sufficiently long to bring about movement of the sleeve 18 from the position shown in full lines in Figure 1 to the dotted line position and from the latter-named position back to the full line position. During this operation of the sleeve a predetermined amount of coffee is deposited into the mixing chamber 8 and as before described, when said sleeve 18 moves into the dotted line position in Figure 1 the measuring valve 26 is operated for dispensing a predetermined amount of water into the mixing chamber 8. The water and coffee contacting pass through the baffle plates and thence into the filter where the coffee grounds are separated from the coffee beverage and the latter passes into the dispensing receptacle. When the sleeve 18 moves into position of depositing coffee into the mixing chamber the electric motor through the gearing and links and levers heretofore described opens the trap door and at the same time actuates the valve 50 so that water will be discharged into the filter for removing therefrom the grounds, the latter gravitating into the collection receptacle 35.

To render this device entirely automatic, a float frame 56 is pivotally mounted in the dispensing receptacle 10 and carries a float 57 which is contacted by the coffee beverage and floats thereon. The pivoted end of the frame 56 carries an extension 58 on which is mounted a pivoted dog 59 adapted to set the time switch in operation when the float 57 lowers to a predetermined level in the dispensing receptacle or, in other words, when the coffee beverage lowers by being dispensed from the receptacle 10 the float 57 descends and sets the time switch in operation so that the electric motor will be operated for a predetermined length of time to bring about supplying the mixing chamber 8 with a predetermined amount of coffee and with a predetermined amount of hot water. Thus it will be seen that as the coffee beverage is consumed from the dispensing receptacle additional coffee will be made and the coffee beverage dispensed into said receptacle and the coffee grounds dispensed from the filter thereby providing a continuous cycle of coffee making operation as well as a cleansing operation to each cycle of coffee making operation.

A burner 60 may be located under the dispensing receptacle 10 for keeping the coffee beverage hot. If desired, the burners 28 and 60 may be thermostatically controlled.

It is believed that the foregoing description, when taken in connection with the drawings, will fully set forth the construction and advantages of this invention to those skilled in the art to which such a device relates, so that further detailed description will not be required.

What I claim is:

1. In a coffee making apparatus including a mixing chamber and a receiving chamber and a conduit connecting the lower end of the mixing chamber with the upper portion of the receiving chamber, a horizontal casing intersecting the conduit and having an inlet opening in its front end which is in communication with that part of the conduit between the casing and the chamber and the rear end of the casing having an outlet opening which is in communication with the other part of the conduit, a diagonal arranged screen in the casing extending from the upper portion of the front end thereof, above the inlet opening downwardly and rearwardly to the lower portion of the rear end of the casing below the outlet opening, said screen separating the coffee grounds from the beverage as the mixture enters the front end of the casing, a door for closing the bottom of the casing, a nozzle in the top of the casing and located above the screen, a water supply pipe connected with the nozzle, a valve in said pipe and means for simultaneously opening the door and the valve to spray water upon the screen and to wash the grounds through the opening left by the door.

2. In a coffee making apparatus a vertically arranged mixing chamber, a hot water pipe extending into the top of the chamber, a measuring valve in the pipe, a hopper located above the mixing chamber and containing ground coffee, said hopper having a hole in its bottom, a tubular member at the top of the mixing chamber and in communication with the chamber, said tubular member being out of alinement with the hole in the hopper, a measuring device supported for horizontal sliding movement between the hopper and the tubular member and including a vertically arranged tube for receiving coffee from the hopper when the measuring member is in one position and when the measuring member is in another position the tube will deliver the coffee therein into the tubular member connected with the mixing chamber, means for sliding the measuring device and a dog carried by the measuring device for actuating the valve when the measuring device is moved.

JOEL T. BOWEN.